W. R. BROWN.
CALIPERS.
APPLICATION FILED JAN. 11, 1913.
1,110,879.
Patented Sept. 15, 1914.
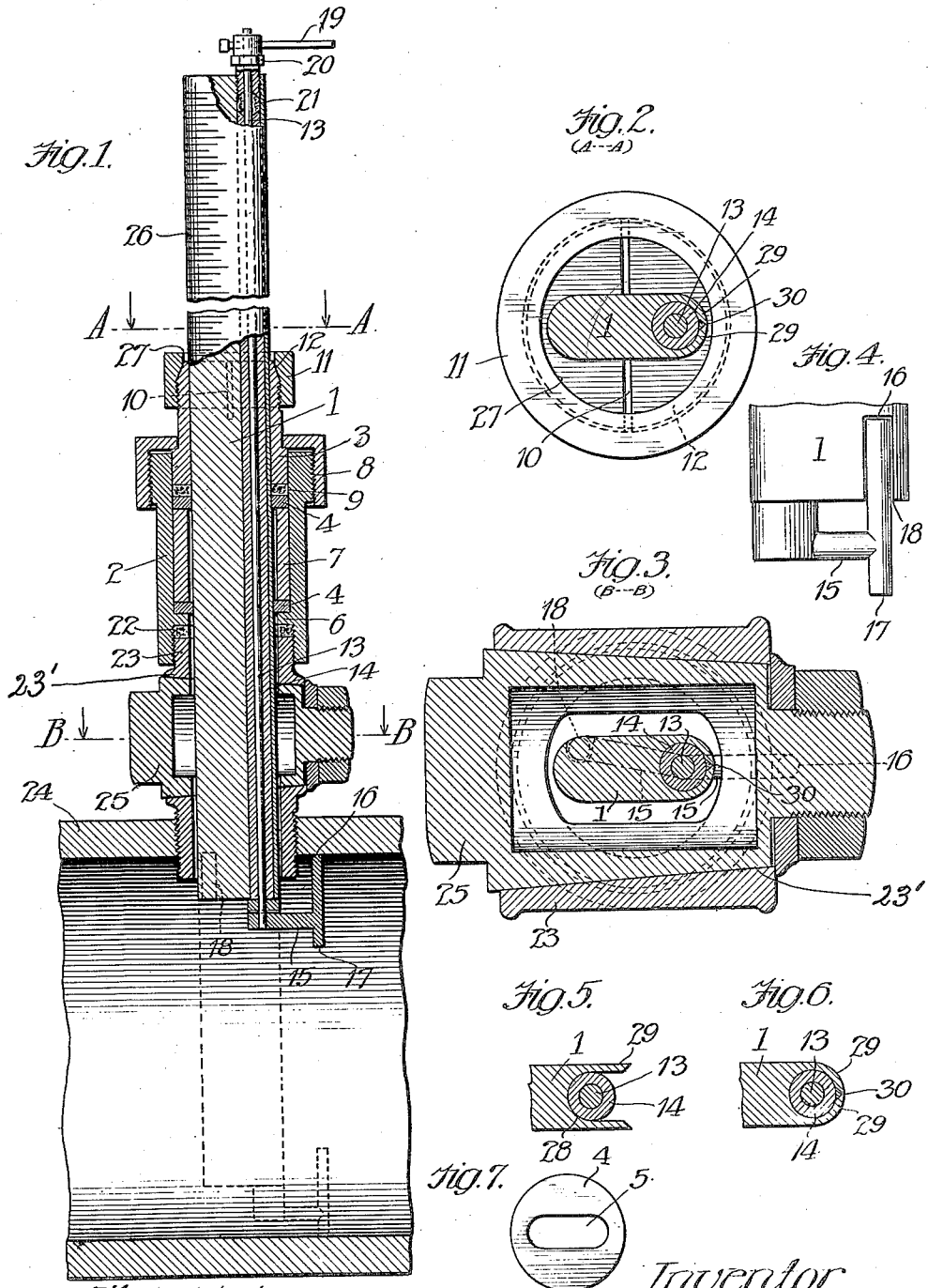

UNITED STATES PATENT OFFICE.

WILLIAM R. BROWN, OF CHICAGO, ILLINOIS, ASSIGNOR TO MUNICIPAL SUPPLY CO., A CORPORATION OF ILLINOIS.

CALIPERS.

1,110,879. Specification of Letters Patent. Patented Sept. 15, 1914.

Application filed January 11, 1913. Serial No. 741,439.

*To all whom it may concern:*

Be it known that I, WILLIAM R. BROWN, a citizen of the United States of America, and a resident of Chicago, county of Cook, and State of Illinois, have invented certain new and useful Improvements in Calipers, of which the following is a specification.

The main objects of this invention are to provide an improved form of caliper adapted for use in measuring the inside diameter of pipes, conduits, etc.; to provide a caliper of this kind particularly adapted for measuring the inside diameter of water mains at times when the pressure is on; to provide an improved form of caliper adapted to be inserted into the pipe through a valve or other communicating passage; to provide an improved arrangement of the gage part whereby it is adapted to be shifted into position to permit the insertion of the instrument into the pipe through the valve or other passage; to provide improved means for securing the caliper in position on the valve whereby it is shiftable from one position to another for making measurements; to provide improved means for locking the caliper in a position to which it is shifted while readings are being taken; and to provide an improved construction of the joints in the caliper parts whereby they are rendered water tight.

An illustrative embodiment of this invention is shown in the accompanying drawings in which—

Figure 1 is a side elevation, partly sectional, of a caliper in position for measuring the inside diameter of a water main. Fig. 2 is a sectional view of the caliper taken on the line A—A of Fig. 1. Fig. 3 is a sectional view taken on the line B—B of Fig. 1. Fig. 4 is a view of the lower end of the caliper showing the gage part shifted to its folded position. Figs. 5 and 6 are fragmentary sectional details illustrating the construction of joints in the caliper. Fig. 7 is a detail of one of the washers which form a part of the supporting member.

In the construction shown, the member or bar 1 is slidably supported on the supporting member or casing which comprises a cylindrical shell 2, a sleeve 3, and supporting washers 4. The washers 4 are of the shape shown in Fig. 7 having an aperture 5 snugly fitting the bar 1. The lowermost washer is supported on the internal annular shoulder 6 of the shell 2 and the upper washer rests upon a bushing 7 which in turn bears upon the lower washer 4. The sleeve 3 is secured within the upper end of the shell 2 by means of the cap 8, a packing ring 9 being interposed between the abutting faces of the sleeve 3 and upper washer 4. The upper end of the sleeve 3 is split at 10 and has a collar 11 embracing the end thereof. The collar and sleeve are provided with coacting tapered shoulders 12 so that when the collar 11 is screwed down onto the sleeve 3 the end thereof will be contracted so as to cause it to grip the bar 1 and secure the same against being shifted.

A rod 13 is revolubly incased in a tube 14 rigidly secured in the bar 1 along one edge thereof. A gage part or member 15 is secured to the lower end of the rod 13 below the end of the bar 1, and is adapted to be shifted from a folded position as shown in Fig. 4 to an extended position as shown in Fig. 1. The gage part 15 is of substantially T-shaped construction arranged with the transverse portion substantially parallel with the rod 13. The transverse portion is arranged with the greater part thereof inward so as to avoid the possibility of the end of the valve 23 from interfering with the making of measurements. The ends 16 and 17 of the transverse portion abut against respectively opposite sides of the pipe for limiting the longitudinal movement of the bar 1. The length of the transverse portion of the T-shaped gage part 15 is any suitable unit, as for instance one inch, and that distance must be included in calculating the diameter of the pipe.

A recess 18 is formed in the lower end of the bar 1 in position to receive the upper end of the transverse portion of the gage part so that it may be folded entirely within the cross sectional area of the bar 1. The rod 13 is revolved by an arm or handle 19 secured to the upper end thereof in such manner that when shifted it will indicate the corresponding position of the gage part 15. A packing gland 20 embraces the rod 13 and is screwed into the upper end of the bar for causing a packing ring 21 between it and the end of the tube 14 to snugly fit the rod 13 and form a water tight joint.

The shell 2 has an internal thread 22 formed in the lower end thereof whereby the supporting member may be secured to the casing 23, of a valve 23' secured in a pipe 24, for the purpose of permitting the bar 1 to be shifted through the valve casing 23 and valve member 25 into the pipe 24.

The tube 14 is secured to the bar 1 by locating it in the recess 28 milled along one edge of the bar and bending the flanges 29, formed by the milling, around the tube. A strip of packing 30 is interposed between the abutting ends of the flanges 29 so that a water tight joint is formed along and around the tube 14.

This device is particularly designed for measuring the diameter of water pipes or mains through which water is flowing, and more often where it is desired to obtain the velocity of the water by the insertion of a Pitot tube in the usual manner.

The operation of the device is as follows: When it is desired to measure the inside diameter of a water main or pipe in which water is flowing, or under pressure, a valve 23', preferably an ordinary plug cock, is secured in the pipe 24 as shown, if one has not already been provided for another purpose. With the gage part 15 located in its folded position and the bar 1 drawn upwardly within the end of the shell 2, the supporting member is secured in position on the upper end of the valve casing 23. The movable valve member 25 is then turned to open the valve whereupon the rod 1 is pushed down through the valve into the pipe 24. The rod 13 is then turned by means of the arm 19 so as to shift the gage part 15 into its extended position. To measure the pipe the rod 1 is first shifted upwardly until the end 16 of the gage part 15 abuts against the pipe 24 whereupon the collar 11 is screwed down onto the sleeve 3 so as to cause the upper end of the sleeve to be contracted and grip the bar 1 for holding it in position. A reading is then made on the scale 26, using the edge 27 of the collar 11. After the reading has been taken the rod 1 is released by unscrewing the collar 11 and is shifted farther into the pipe so that the end 17 of the gage part 15 abuts against the opposite side of the pipe, as indicated in dotted outline in Fig. 1. The collar 11 is again screwed down so as to secure the rod 1 while a second reading is being taken with the scale 26 and edge 27 of said collar. The difference between these readings is then noted to which is added the length of the transverse portion of the gage part 15, the result being the actual inside diameter of the pipe 24. The rod 1 is again released from the sleeve 3 and the gage part 15 shifted to its folded position in the recess 18 which will allow the rod to be drawn outwardly through the valve 23' up into the end of the sleeve 2. The valve 23' is then closed and the caliper removed.

Although but one specific embodiment of this invention has been herein shown and described, it will be understood that numerous details of the construction shown may be altered or omitted without departing from the spirit of this invention as defined by the following claims.

I claim:—

1. A caliper of the class described, comprising a member adapted to be inserted through an aperture in the side wall of a pipe, a rod revolubly mounted in said member, a substantially T-shaped part carried by said rod with the transverse portion of said part substantially parallel with said rod, and means for revolving said rod so as to shift said gage part into and out of position for permitting the opposite ends of said transverse portion to engage the walls of said pipe when said member is shifted.

2. A caliper of the class described comprising a supporting member, a bar slidably mounted therein, means for securing said supporting member on a pipe in position to have said bar inserted through a passage therein, and a substantially T-shaped gage part carried by said bar, with the transverse portion of said part substantially parallel with said bar, said bar being shiftable longitudinally for causing the opposite ends of said portion to abut against respectively opposite sides of said pipe.

3. A caliper of the class described, comprising a supporting member, a bar slidably mounted therein, means for securing said supporting member on a pipe in position to have said bar inserted through a passage therein, a substantially T-shaped gage part carried by said bar, with the transverse portion of said part substantially parallel with said bar, said bar being shiftable longitudinally for causing the opposite ends of said portion to abut against respectively opposite sides of said pipe, and means on said supporting member adapted to be shifted for clamping said bar thereto.

4. A caliper of the class described, comprising a supporting member, a bar slidably mounted therein, means for securing said supporting member on a pipe in position to have said bar inserted through a passage therein, a substantially T-shaped gage part carried by said bar, with the transverse portion of said part substantially parallel with said bar, said bar being shiftable longitudinally for causing the opposite ends of said portion to abut against respectively opposite sides of said pipe, and means adapted to shift said gage part into and out of position for abutting against said pipe.

Signed at Chicago this 28th day of December 1912.

WILLIAM R. BROWN.

Witnesses:
 EUGENE A. RUMMLER,
 M. IRENE HUTCHINGS.